(12) United States Patent
Hirano et al.

(10) Patent No.: US 7,730,342 B2
(45) Date of Patent: Jun. 1, 2010

(54) SERVER SYSTEM

(75) Inventors: Yoshitaka Hirano, Kawasaki (JP); Kazuyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 11/474,157

(22) Filed: Jun. 23, 2006

(65) Prior Publication Data

US 2007/0216933 A1  Sep. 20, 2007

(30) Foreign Application Priority Data

Mar. 16, 2006  (JP) .............................. 2006-073173

(51) Int. Cl.
*G06F 11/00* (2006.01)
(52) U.S. Cl. .......................................... 714/4; 718/103
(58) Field of Classification Search .................... 714/1, 714/4, 5; 718/103, 100, 102, 105; 700/5
See application file for complete search history.

(56) References Cited

U.S. PATENT DOCUMENTS

| 7,389,292 | B2* | 6/2008 | Prakash | 707/8 |
| 7,552,214 | B2* | 6/2009 | Venkatasubramanian | 709/225 |
| 7,577,667 | B2* | 8/2009 | Hinshaw et al. | 707/100 |
| 7,634,477 | B2* | 12/2009 | Hinshaw | 707/10 |
| 2004/0210605 | A1 | 10/2004 | Hara et al. | |
| 2009/0055444 | A1 | 2/2009 | Hara et al. | |
| 2009/0235263 | A1* | 9/2009 | Furukawa | 718/102 |

FOREIGN PATENT DOCUMENTS

| JP | 55-037626 | 3/1980 |
| JP | 03-126158 | 5/1991 |
| JP | 08-255130 | 10/1996 |
| JP | 2000-268011 | 9/2000 |
| JP | 2001-282551 | 10/2001 |
| JP | 2004-206298 | 7/2004 |
| JP | 2004-318744 | 11/2004 |

* cited by examiner

*Primary Examiner*—Dieu-Minh Le
(74) *Attorney, Agent, or Firm*—Greer, Burns & Crain, Ltd.

(57) ABSTRACT

A server system has a shared storage device including a job queue storage area, a job queue registration request storage area and a job assignment storage area, a first server including a job queue registration processing unit registering the job execution request in the job queue storage area according to the registration request information written to the job queue registration request storage area, a second server including an assignment processing unit assigning the job execution request registered in the job queue storage area to the execution server, and writing the relationship between the execution server and the job execution request of the job assigned to the execution server to the job assignment storage area, and an execution server including an execution unit acquiring the job execution request from the job assignment storage area provided for the execution server, and executing the assigned job.

11 Claims, 16 Drawing Sheets

FIG. 5

| STORAGE DATE/TIME | INTRA JOB QUEUE MANAGEMENT INFORMATION | JOB NAME | EXECUTION-REQUESTED SERVER | EXECUTABLE SERVER ATTRIBUTE | UNDER-EXECUTION SERVER | JOB STATUS | OTHER INFORMATION (EXECUTION PRIORITY /EXECUTION START TIME, ETC) |
|---|---|---|---|---|---|---|---|
| : : | 00001 | : : | | | | | |
| mm/dd hh:mm:ss | AAA01 | job01 | server01 | Windouws-grp | server04 | UNDER-EXECUTION | — |
| : : | AAA02 | job02 | server01 | Windouws_DB-grp | server05 | UNDER-EXECUTION | — |
| : : | AAA03 | job03 | server04 | Linux-grp | | QUEUING FOR EXECUTION | START OF EXECUTION AT AA O'CLOCK YY MINUTES |
| : : | AAA04 | job04 | server02 | Windows-grp | | QUEUING FOR EXECUTION | — |
| : : | AAA05 | job05 | server01 | Linux-grp | server03 | UNDER-EXECUTION | HIGH EXECUTION PRIORITY |
| : : | AAA06 | job10 | server01 | MSP-grp | server01 | UNDER-EXECUTION | — |
| : : | AAA07 | job11 | server01 | MSP-grp | | QUEUING FOR EXECUTION | — |
| : : | : : | | | | | | |
| | a | | | | | | |

FIG. 6

| server01 REGISTRATION REQUEST INFORMATION AREA | |  |
|---|---|---|
| : | |  |
| server x REGISTRATION REQUEST INFORMATION AREA | JOB STORAGE AREA 1 | |
| | : | |
| | JOB STORAGE AREA y | MANAGEMENT STATUS |
| | | JOB NAME |
| | | EXECUTABLE SERVER ATTRIBUTE |
| | | OTHER INFORMATION |
| | : | |
| | JOB STORAGE AREA c | |
| : | | |
| server b REGISTRATION REQUEST INFORMATION AREA | | |

FIG. 7

| PROCESSING PRIORITY | SERVER NAME | STATUS | SCHEDULE PROCESSING DATE/TIME |
|---|---|---|---|
| 1 | server02 | active | 2005/01/01 10:12:00 |
| 2 | server01 | stop | (NULL) |
| 10 | server04 | active | (NULL) | b-PIECES OF RECORDS

SERVER SYSTEM

BACKGROUND OF THE INVENTION

The present invention relates to a job management technology in an information system including a plurality of servers.

There is a system in such a mode that data are allocated on an array disk device (which will hereinafter be termed a shared disk) that can be shared among servers. In this type of system, a plurality of servers shares information used for operations (which will hereinafter be referred to as jobs) executed by the respective servers with each other through the shared disk.

FIG. 1 shows an example of this type of conventional system architecture. In the conventional system, as in FIG. 1, for instance, data of the job executed by a server A is written to the shared disk. On the other hand, data of the job executed by a server B is read from the shared disk. An execution order of the jobs having such a dependent relationship has hitherto been set as a rule (schedule), thus conducting the operation.

This type of system aims the point at only the data used for the job but does not direct the point to control of the job. Further, when the job operation is performed by the plurality of servers, items of schedule information of the job are allocated to the respective servers, each server operates the job, and there is prepared a management server that manages the job schedules of all the servers in a concentrated manner. Then, the management server concentratedly schedules the jobs of other servers. In this mode, in case of a stop of the server managing the jobs in a concentrated manner, the schedule of the jobs can not be implemented between the servers transferring and receiving the data mutually and thus linking up with each other, thereby hindering the job operation.

Thus, such a technology (Systemwalker (registered trademark) etc.) has hitherto existed that a certain specified server manages the schedule information of the jobs in a concentrated manner. A batch (jobs) operated by the plurality of servers is thereby built up. If the server managing the schedule information of the jobs in a concentrated manner stops for some reason, however, there stops the job operated by the plurality of servers in a way that links up these servers with each other.

Further, the schedule information of the job might exist also, not limited to the management server, in the server executing the job. Hence, there is a necessity of, in maintenance such as backing up and restoring the system, backing up and restoring the job schedule information existing in all the servers.

[Patent document 1] Japanese Examined Patent Publication No.7-101407
[Patent document 2] Japanese Patent Application Laid-Open Publication No. 55-037626
[Patent document 3] Japanese Patent Application Publication No. 3516049
[Patent document 4] Japanese Patent Application Laid-Open Publication No. 2001-282551

SUMMARY OF THE INVENTION

It is an object of the present invention to improve reliability of job schedule management and system stability in a system where plural servers are linked up with each other.

The present invention adopts the following means in order to solve the problems. Namely, the present invention is a server system comprising a plurality of servers including a server functioning as a first server or a second server, and a shared storage device shared with the plurality of servers, the shared storage device including a job queue storage area controlling a job execution order by registering a job execution request and stored with a status of the job till the execution of the job is completed, a job queue registration request storage area, provided for every request server requesting the job to be executed, to which to write such an item of registration request information as to request the registration of the job execution request in the job queue storage area, and a job assignment storage area provided for every execution server executing the job and stored with a relationship between the execution server and the execution request of the job assigned to the execution server, the first server including a job queue registration processing unit registering the job execution request in the job queue storage area according to the registration request information written to the job queue registration request storage area, the second server including an assignment processing unit assigning the job execution request registered in the job queue storage area to the execution server, and writing the relationship between the execution server and the job execution request of the job assigned to the execution server to the job assignment storage area, and the execution server including an execution unit acquiring the job execution request from the job assignment storage area provided for the execution server, and executing the assigned job.

According to the present invention, the shared storage device controls the job execution order by registering the job execution request and is stored with the job status till the execution of the job is completed, the first server registers the job queue storage area with the job execution request according to the registration request information written to the job queue registration request storage area, the second server assigns the job execution request registered in the job queue storage area to the execution server, and the execution server executes the assigned job. Accordingly, the jobs executed by the plurality of servers are managed through the shared storage device, and the jobs can be executed by the plurality of server.

Further, the present invention may be a method by which a computer, other devices, machines, etc execute any one of the processes described above. Still further, the present invention may also be a program executable by the computer, which makes the computer, other devices, machines, etc execute any one of the processes described above. Yet further, the present invention may also be a recoding medium recorded with such a program that is readable by the computer, other devices, machines, etc.

According to the present invention, it is possible to improve the reliability of the job schedule management and the system stability in the system where the plural servers are linked up with each other.

BRIEF DESCRIPTION OF THE DRAWINGS

FIG. 5 is a diagram showing a data structure of a job queue information area stored with a job schedule;

FIG. 6 is a diagram showing a data structure of a registration request information area;

FIG. 7 is a diagram showing an example of a data structure of a schedule function control area;

DETAILED DESCRIPTION OF THE INVENTION

Figure 1:
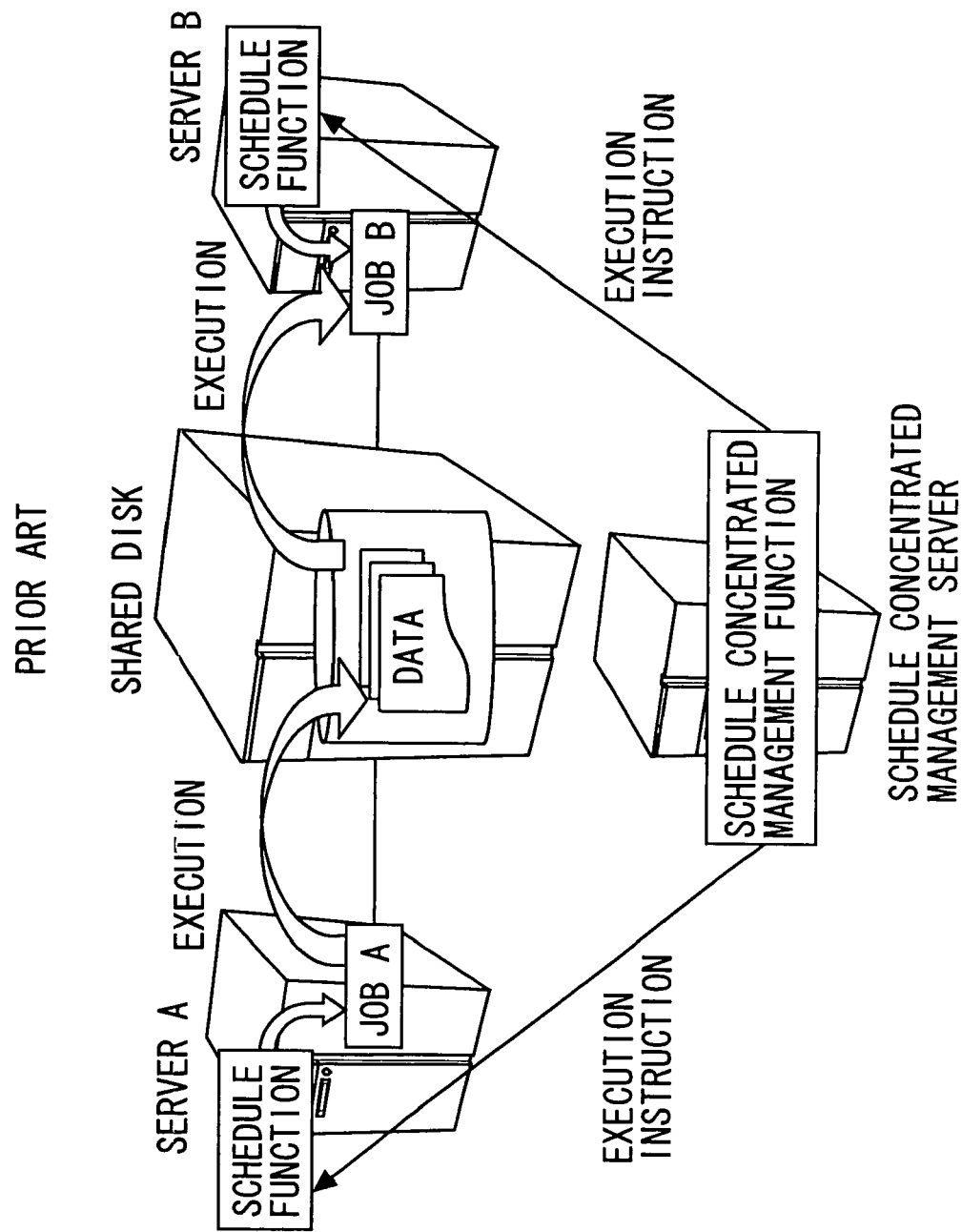
FIG. 1 is a diagram showing an example of a conventional system architecture

An information system according to a best mode (which will hereinafter be termed an embodiment) for carrying out the present invention will hereinafter be described with reference to the drawings. A configuration in the following embodiment is an exemplification, and the present invention is not limited to the configuration in the embodiment.

<Substance of the Invention>

The information system includes a plurality of servers and a shared disk shared with the plurality of servers. In this information system, queue information of a job (which will hereinafter be also termed a job queue) is allocated onto the shared disk. Each server is provided with a function (of registering the job in the queue information) of scheduling the job and with a function of executing the job. Each server executes the job scheduling function, whereby the jobs in a distributed system centered at the shared disk are executed without concentrating the job scheduling functions on a specified server.

The job scheduling function is separated into a registration request function of requesting job registration and a schedule management function of registering the job as the queue information in response to the registration request. The plurality of servers has the registration request function. The single server (which is called a schedule management server) selected from the plurality of servers takes charge of the schedule management function. If it is judged that the schedule management server in charge of the schedule management function stops (system down) due to an unexpected situation, however, a server that executes the schedule management function as a substitute for the schedule management server is determined according to a predetermined priority order.

Similarly, the job execution function is separated into an execution function of executing the job and an execution management function of designating, in the execution function, the job that should be executed. The plurality of servers has the execution function. The single server (which is called an execution management server) selected from the plurality of servers takes charge of the execution management function. If it is judged that the execution management server in charge of the execution management function stops (system down) due to an unexpected situation, however, a server that executes the execution management function in place of the execution management server is determined according to a predetermined priority order.

The shared disk is stored with information on priority levels from which the order of taking charge of the management function is determined among the plural servers. The plurality of servers capable of executing the management function in place of the schedule management server checks the priority levels assigned to other servers. Then, each server has a function of comparing the priority level assigned to the self device with the priority levels assigned to those other servers and thus judging whether the self device takes charge of the job schedule or not.

Each server, when judging that the self device takes charge of the job scheduling, refers to the schedule stored in the shared disk, and executes the schedule management function, i.e., the job scheduling.

<System Architecture>

Figure 2:
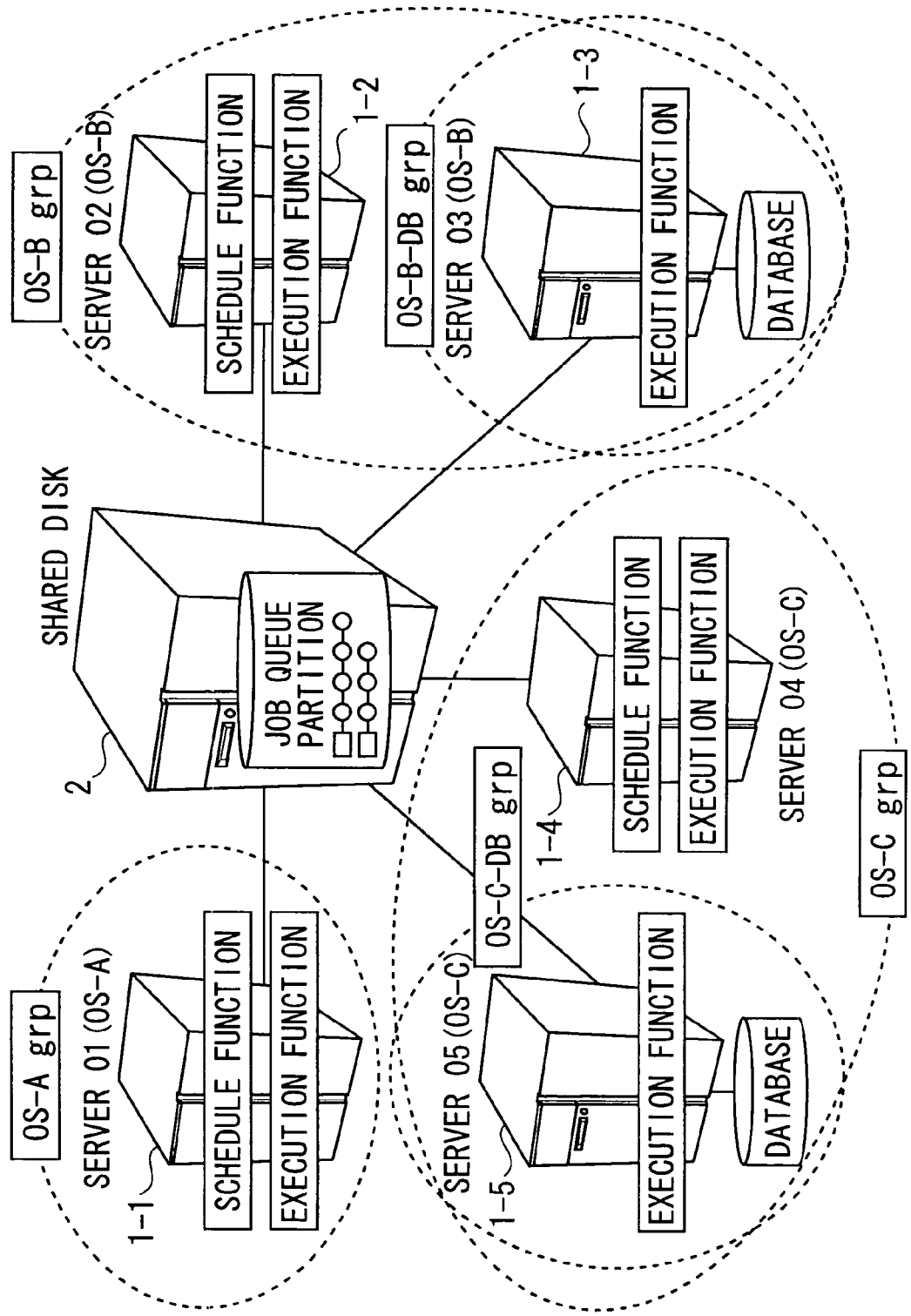
FIG. 2 is a diagram showing a system architecture of. an information system according to one embodiment of the present invention.

FIG. 2 shows a system architecture of the information system. As in FIG. 2, the information system includes a plurality of servers 1-1 through 1-5, and a shared disk 2 shared with the plurality of servers 1-1 through 1-5. Hereinafter, in the embodiment, these servers 1-1 through 1-5, when generically termed, are simply referred to the server 1.

In the information system, each server can be installed with a different OS (Operating System). The respective servers are grouped according to the installed OSs. An example in FIG. 2 is that the server 1-1 installed with OS-A belongs to a group named OS-A grp.

Further, the servers 1-2, 1-3 installed with OS-B belong to a group named OS-B grp. The group named OS-B grp, however, further includes a subdivided group (sub-group) named OS-B-DB grp. The sub-group OS-B-DB grp is a group, providing a database function under the control of the OS-B, to which the server 1-3 belongs. The group OS-B grp excluding the sub-group OS-B-DB grp is the group, having none of the database function, to which the server 1-2 belongs. A group OS-C grp has the same type of subdivided group named OS-C-DB grp.

Note that the OS-A through the OS-C include, for example, an OS for a general-purpose and large-sized computer, an OS opened to the public free of charge such as Linux, a commercial based OS such as Windows (registered trademark) and other OSs developed in specifications different depending on benders. Such OS-based grouping is judged as a condition (which is also called a server attribute) for assigning the job undergoing the execution request to each server. This is because the job is assigned an application program functioning on the specified OS.

Further, as in FIG. 2, any one of the servers has any one of the execution functions of the server attributes. The execution function is a function of executing the job. Moreover, the servers 1-1, 1-2 and 1-4 have a schedule function. The schedule function is a function of receiving the execution request from a job scheduler product or accepting the execution request of the job from an operator, and demanding the execution request of the information system.

Furthermore, in the information system, any one of the servers (each corresponding to a request server according to the present invention) having the schedule function executes the schedule management function. The server executing the schedule management function will hereinafter be called a schedule management server (corresponding to a first server according to the present invention). The schedule management server registers, in the job queue, the execution request of the job requested from other servers demanding the execution request.

Similarly, any one of the servers (each corresponding to an execution server according to the present invention) having the execution function executes the execution management function. The server executing the execution management function will hereinafter be called an execution management server (corresponding to a second server according to the present invention). The execution management server designates, based on the information about the job registered in the job queue, the job that should be executed in the server of the OS group.

The shared disk 2 can be accessed from the plurality of servers configuring the information system. A variety of interfaces through which the plurality of servers accesses the shared disk 2 are proposed, and the explanations thereof are omitted because of their configurations being widely known. This type of interface can be exemplified by FC-SCSI (Fibre Channel-Small Computer System Interface).

Figure 3:
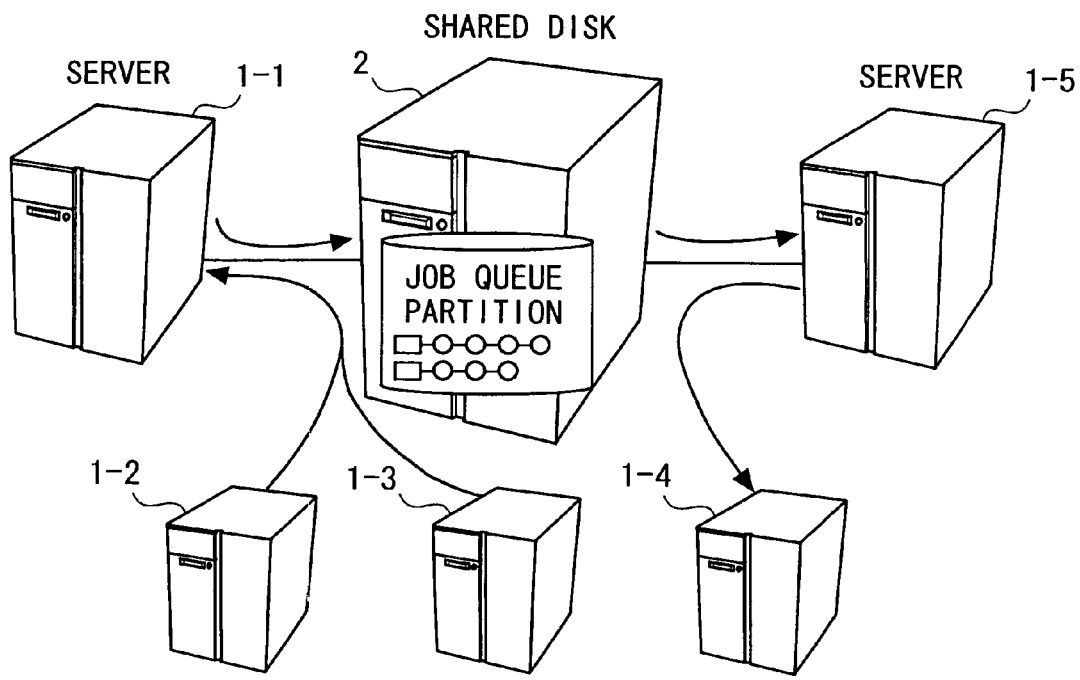
FIG. 3 is a diagram showing a relationship between a schedule management server, an execution management server, servers other than these servers and a shared disk.

FIG. 3 shows a relationship between the schedule management server, the execution management server, other servers excluding these servers and the shared disk 2. An assumption in the example in FIG. 3 is that the server 1-1 functions as the schedule management server, the server 1-5 functions as the execution management server, the server 1-2 has the schedule function of making the job execution request, and the server 1-5 has the execution function. Further, the shared disk 2 is provided with a job queue partition stored with management information of the job queue etc.

Figure 4:
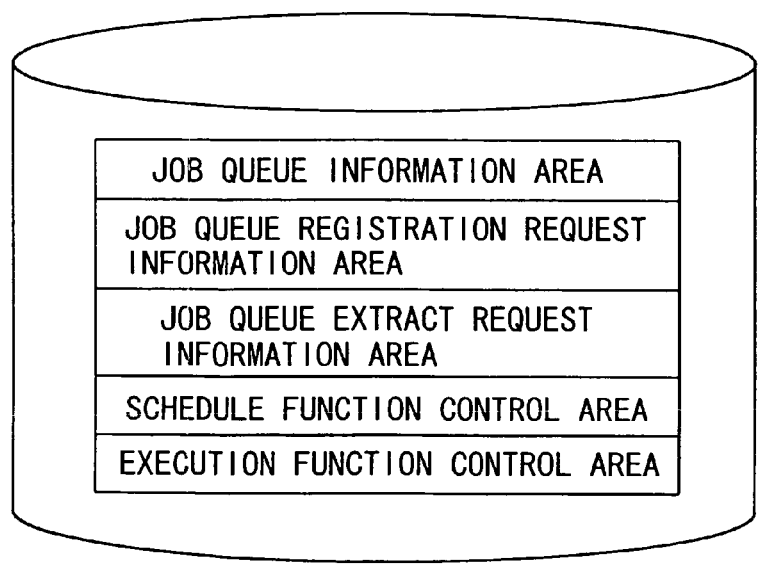
FIG. 4 is a diagram showing a structure of a job queue partition.

FIG. 4 shows a structure of the job queue partition. The job queue partition includes a job queue information area stored with the job queue, a job queue registration request information area stored with the request for the registration in the job queue, a job queue extract request information area for the request for extracting the job that should be executed from the job queue, a schedule function control area for management of the priority levels among the plural servers capable of executing the schedule management function, and an execution function control area stored with the priority levels among the plural servers capable of executing the execution management function.

Herein, outlines of the job execution request, the registration in the job queue and the assignment of the jobs registered in the job queue to the servers, will be explained with reference to FIG. 3. For instance, the servers 1-2, 1-3, etc having the schedule function receive the execution request from the job scheduler product or accept the job execution request from the operator, and write the job execution request to the shared disk 2. A write location is the job queue registration request information area in the job queue partition.

The server 1-1 (the present schedule management server) executing the schedule management function monitors the job queue registration request information area. Then, if the job execution request is written to the job queue registration request information area and if the job queue information area contains a null entry, the server 1-1 registers the job execution request in the job queue information area on the basis of the job execution request.

On the other hand, the server 1-5 (the present execution management server) executing the execution management function monitors the job queue information area. Then, if the job queue information area contains the jobs queued for the execution (not-yet-executed jobs) and if the server belonging to the OS group designated by the job in the servers such as the server 1-2 having the execution function makes the request for extracting the job, the server 1-5 transfers the job concerned to the server 1-2 etc. The server 1-2 etc, to which the content of the job has thus been transferred, executes the job thereof. It is to be noted that the job extract request is to be written by each individual server having the execution function to the job queue extract request information area in the job queue partition.

Moreover, the server 1-2 etc having the schedule function monitors the server 1-1 executing the schedule management function at the present. Then, in the case of presuming that the server 1-1 etc stops due to the unexpected situation, it follows that the server having the highest priority level in the servers such as the server 1-2 executes the schedule management function according to the priority levels in the schedule function control area. At this time, the server 1-1 is released from a role of executing the schedule management function.

Similarly, the server 1-2 etc having the execution function monitors the server 1-5 executing the execution management function at the present. Then, in the case of presuming that the server 1-5 etc stops due to the unexpected situation, it follows that the server having the highest priority level in the servers such as the server 1-2 executes the execution management function according to the priority levels in the execution function control area. At this time, the server 1-5 is released from a role of executing the execution management function.

<Data Structure of Job Queue Partition>

A data structure of the job queue partition will be explained with reference to the drawings in FIGS. 5 through 9. FIG. 5 is a diagram showing the data structure of the job queue information area (corresponding to a job queue storage area according to the present invention) stored with the job schedule. In a table in FIG. 5, the uppermost row displays items (fields) of record registered in the job queue information area. Accordingly, the records representing the specific job schedule are given from the second and lower rows in the table in FIG. 5.

As in FIG. 5, each of the records in the job queue information area has items (fields) such as a storage date/time, intra-job-queue management information, a job name, an execution-requested server, an executable server attribute, an under-execution server, a job status, and other information.

The storage date/time represents a date and time when the schedule management server having the schedule management function registers the record of the job queue in the job queue information area on the basis of the information in the job queue registration request information area.

The intra-job-queue management information is a serial number in the job queue information area. The record of each job in the job queue information area is uniquely identified by the intra-job-queue management information.

The job name is a name of the job. The job name is a name facilitating recognition by a user when displaying the contents in the job queue. Normally, the job name is a title containing a name of a command, a name of a program, etc, which are executed in the job. In this case, the server 1-2 etc writing the job execution request to the job queue registration request information area may determine the job name in a predetermined procedure. Further, for example, the schedule management server executing the schedule management function may also determine the job name in a predetermined procedure.

The execution-requested server is the server 1-4 etc that is assigned the job from the execution management server having the execution management function. The executable server attribute is an execution condition (server attribute) designated in the job execution request and is, e.g., designation of the OS group. The under-execution server is a computer name of the server that is now executing the job.

The job status is e.g., under-execution, queuing for the execution, and so on. Note that the shared disk 2 may also be provided with, separately from the job status, an area stored with status information of the schedule function or the execution function in preparation against such a case that the schedule function (the schedule management server) or the execution function (the execution management server) gets into an abnormal end in the middle of processing the job queue.

Other information is exemplified such as a priority of the execution and designation of execution start time.

FIG. 6 shows a data structure of the registration request information area (corresponding to a job queue registration request storage area according to the present invention). The registration request information area is segmented for every server such as server 1-2 having the schedule function. In the example in FIG. 6, there are provided totally b-pieces of areas (corresponding to server x (x=1, . . . , b)) of a server 01 registration request information area through a server b registration request information area.

FIG. 6 illustrates the area for the server x in detail. As in FIG. 6, one registration request information area (e.g., the area for, e.g., server x) is segmented into a plurality of job storage areas (totally c-pieces of areas in the case of FIG. 6). Herein, the count c (the c-pieces) is a limit number of the jobs requestable by the server x as one server having the schedule function (which is a limit capacity capable of storing the registration requests before the job is registered in the job queue information area).

One job storage area has fields such as a management status, a job name, an executable server attribute and other information.

Herein, the management status is stored with the following items of information.

Job storage area being unused (including an already-done job migration to the job queue information area); this represents that the job storage area is in a null status.

Job registration request in job queue information area being already done; this represents that the job storage area is in the middle of being used, and represents queuing for the registration in the job queue information area.

Note that information showing a status of the schedule function may also be stored as the management status in preparation against such a case that the schedule function (the schedule management server) gets into the abnormal end during the process of the job queue information area.

The job name is a job name to be registered in the job queue information area. For example, the job name may be set by a parameter designated from the user. Further, if the user does not designate the job name, the server 1-2 etc having the schedule function may set a default name. Moreover, the server 1-2 etc having the schedule function may also determine the job name in a predetermined procedure on the basis of a name of the program executed in the job, and so on.

The executable server attribute is a condition of the server 1-5 etc necessary for executing the job. For instance, the OS group is designated. Other information is exemplified such as the priority of the execution and the designation of the execution start time. The job name, the executable server attribute and other information are taken over intactly as the contents registered in the job queue information area.

FIG. 7 shows an example of a data structure of the schedule function control area (corresponding to a first server management information storage area according to the present invention). In a table in FIG. 7, the uppermost row displays items (fields) of record registered in the schedule function control area. Accordingly, the specific records in the schedule function control area are given from the second and lower rows in the table in FIG. 7. The number of the records (b-pieces of records in FIG. 7) provided in the schedule function control area corresponds to the number of the servers having the schedule function, wherein each record is associated with each server. The schedule function control area contains the information for determining the server that executes the schedule management function in place of the schedule management server in case of a stop of the schedule management server executing the schedule management function at the present in the servers having the schedule function.

As in FIG. 7, each of the records in the schedule function control area has fields such as a processing priority, a server name, a status and a schedule processing date/time. The processing priority represents a priority level when the server 1-1 etc designated in each record executes the schedule management function. Herein, a priority level "1" shall be the highest priority level. If it is presumed that the schedule management server executing the manage function at the present stops, in the servers excluding this schedule management server, the server exhibiting the highest processing priority becomes the schedule management server.

The server name is a computer name of the server managed in each record. The status represents an operating status of each server. For instance, "active" indicating "under-operation" or "stop" indicating "remaining stopped" is entered therein. The schedule processing date/time is a date and time written (timestamped) periodically by the server executing the schedule management function.

The "schedule processing date/time" field is monitored by the servers, excluding the schedule management server, such as the server 1-2 having the schedule function. Then, the servers such as the server 1-2 excluding the schedule management server presume that the server having the schedule management function stops operating due to an unexpected cause if there is no update in value in the "schedule processing date/time" field for a predetermined or longer period of time.

In this case, in the servers such as the server 1-2 having the schedule function, the server, which is in the "active" status and exhibits the highest processing priority, becomes the schedule management server. It should be noted that in the information system, even when the server exists, which has the higher processing priority than that of the server executing the schedule management function at the present and is "active" in its status, the server of the higher priority does not immediately execute the schedule management function in place of the present schedule management server. Namely, the schedule management server is replaced by one other server only when this schedule management server stops or in such a case that the schedule management server is forcibly switched over by an operator's manipulation.

The processing priority is set for increasing such a possibility to the greatest possible degree that one other server surely takes over the schedule management function (in order to reduce the possibility of stopping the management function to the greatest possible degree) if the schedule management server stops. Namely it is not purpose to adjust the priority itself among the servers.

Figure 8:
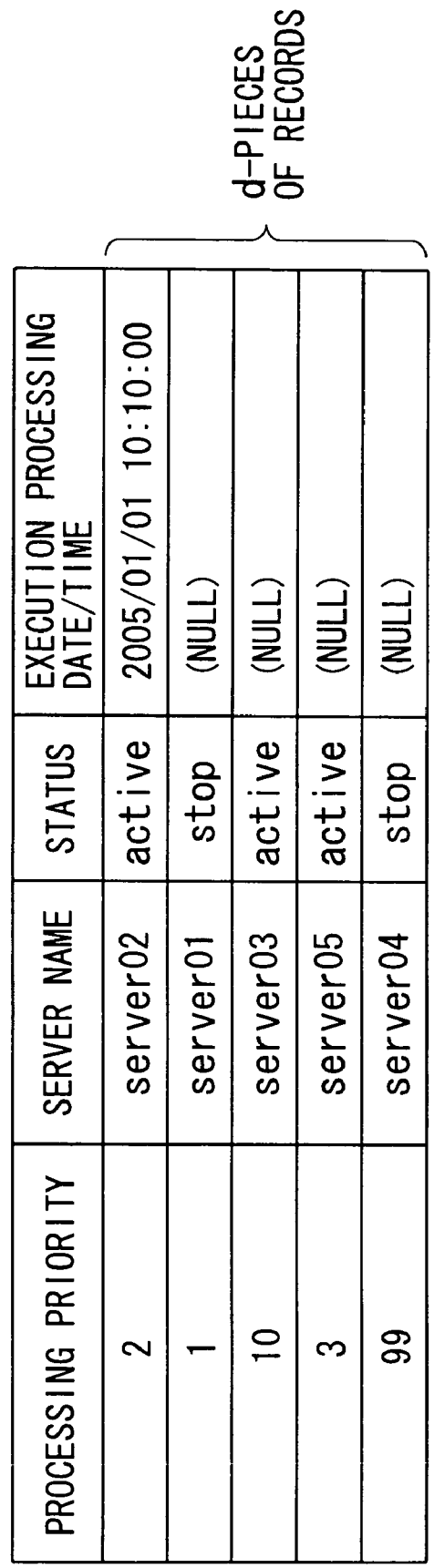
FIG. 8 is a diagram showing a data structure of an execution function control area.

FIG. 8 shows an example of a data structure of the execution function control area (corresponding to a second management information storage area according to the present invention). The number of the records (d-pieces of records in FIG. 8) provided in the execution function control area corresponds to the number of the servers having the execution function, wherein each record is associated with each server. The execution function control area contains the information for determining the server that executes the execution management function next in place of the execution management server in case of a stop of the execution management server executing the execution management function at the present in the servers having the execution function.

As in FIG. 8, a structure of the record in the execution function control area is the same as that of the record in the schedule function control area. Namely, this is because a role of the execution function control area is the same as that of the schedule function control area except a point that the server selected according to the priority has the execution management function.

Figure 9:
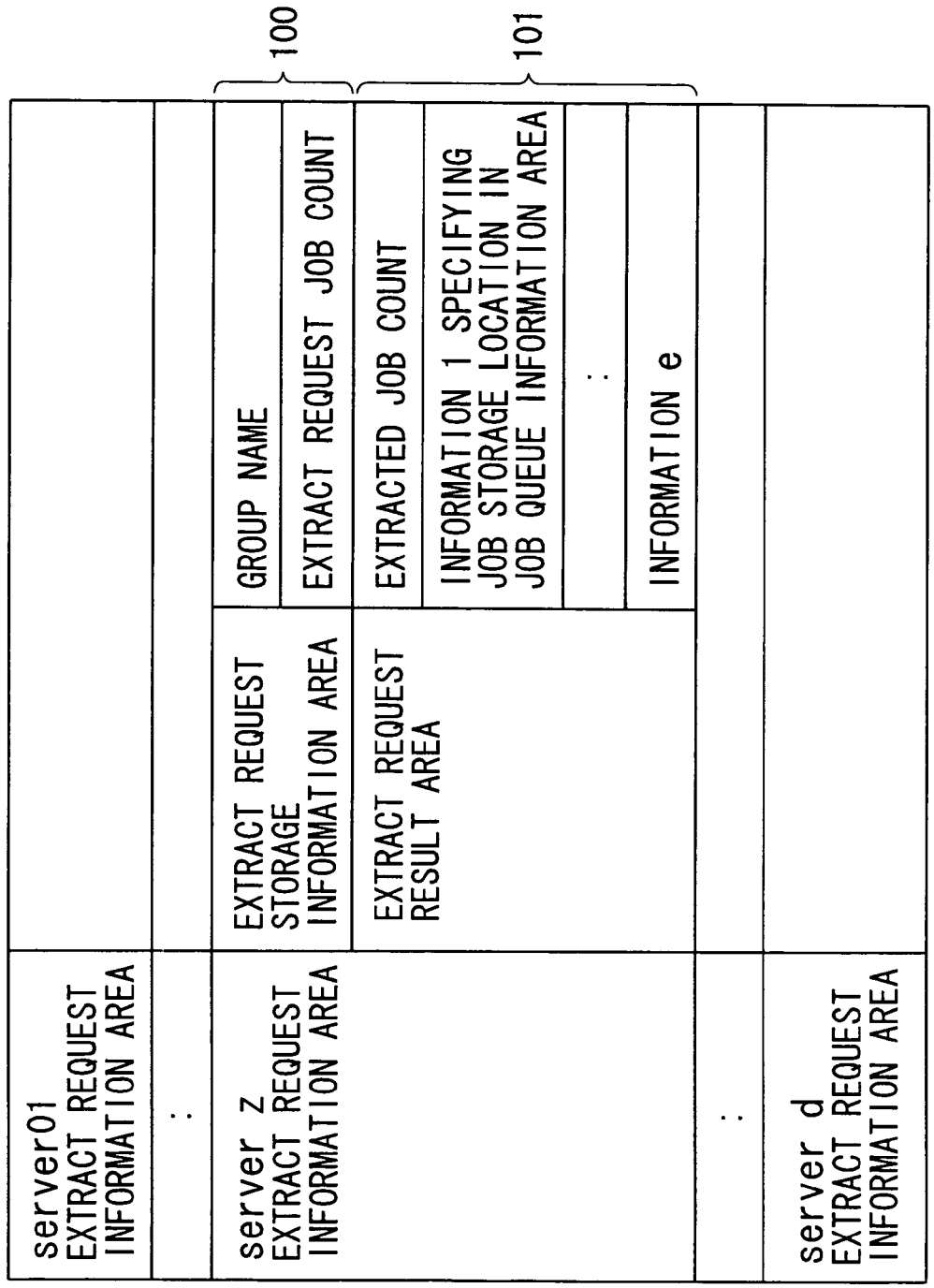
FIG. 9 is a diagram showing a data structure of a job queue extract request information area.

FIG. 9 shows an example of a data structure of a job queue extract request information area. The job queue extract request information area is segmented for every server such as server 1-2 having the execution function. In the example in FIG. 9, there are provided totally d-pieces of areas (corresponding to server z (z=1, . . . , d)) of a server 01 extract request information area through a server d extract request information area.

FIG. 9 illustrates the area of server z in detail. As in FIG. 9, one area (e.g., the area for server z) in the registration request area contains an extract request storage information area 100 and an extract request result area 101 (corresponding to a job assignment storage area according to the present invention).

Each server 1-2 etc having the execution function writes in the extract request storage information area 100. The extract request storage information area 100 contains a group name and an extract request job count. The group name is a server attribute (which is a group of the OS installed in the server) managed in the extract request information area. It is judged from the group name which type of server attribute the server has.

The extract request job count is the number of jobs to be extracted from the job queue information area by the execution management server undergoing the extract request from the server concerned. The extract request job count is information showing specifying what degree the server concerned can presently accept the jobs to. This extract request job count may be determined based on a load of the server concerned.

Further, the extract request result area 101 is stored with the jobs assigned to the servers having the execution function with respect to the jobs in the job queue information area. Namely, the execution management server (e.g., the server 1-5) having the execution management function collates a state of the job queue information area with the extract request storage information area 100. Then, the execution management server writes the job coincident with the group name (the server attribute) in the extract request storage information area 100 to the extract request result area 101.

As in FIG. 9, the extract request result area 101 is segmented into an extracted job count and a plurality of extract request result storage sub-areas (totally e-pieces of sub-areas in the case of FIG. 6). Herein, the count e (e-pieces) is a limit job count assignable at a time to the server z defined as one server having the execution function (which is the assignable job count before the job execution is completed).

Moreover, pieces of information showing storage locations of the extracted jobs in the job queue information area are written to the respective extract request result storage sub-areas.

<Processing Flow>

Figure 10:
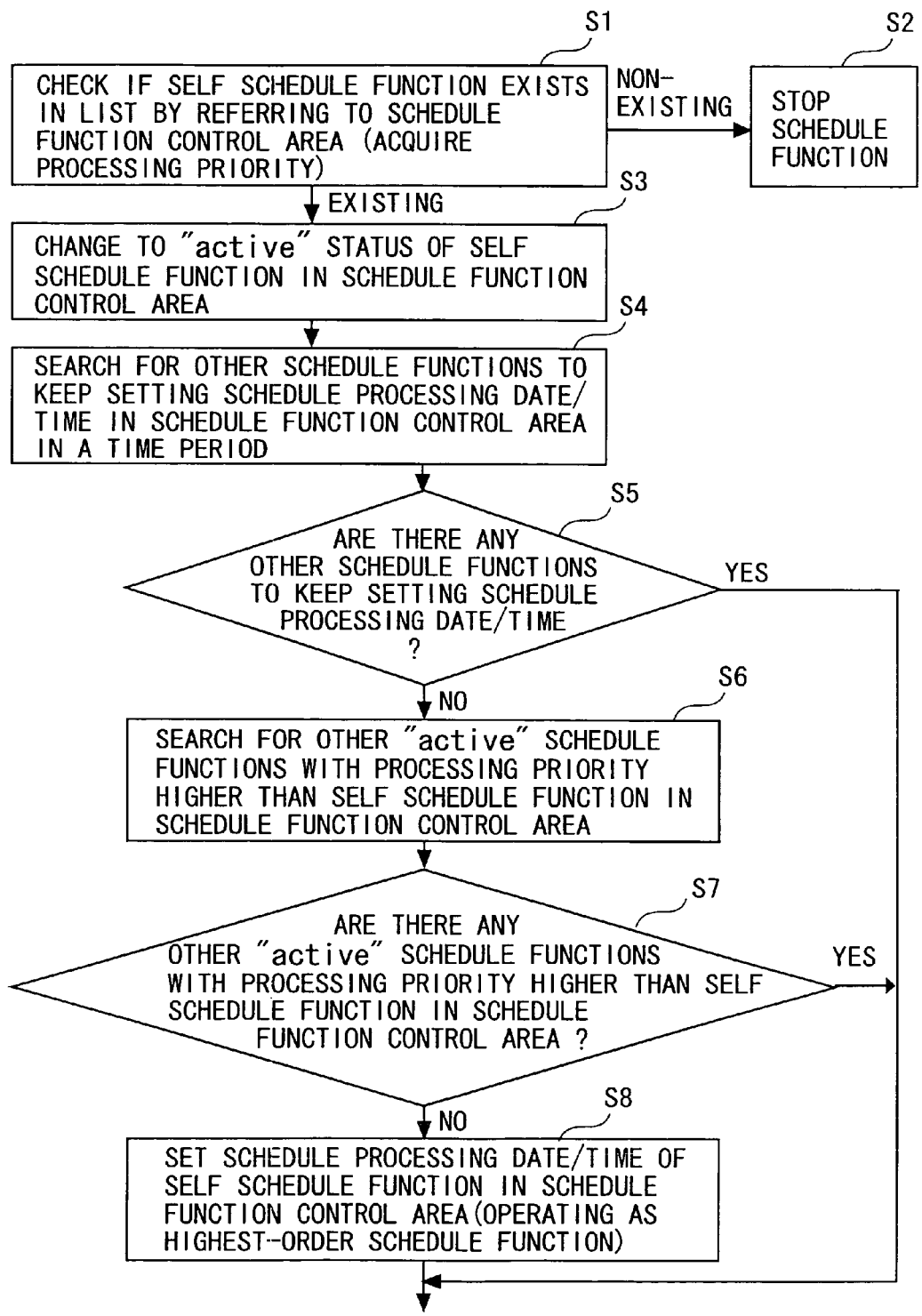
FIG. 10 is a flowchart showing a method of determining priority for executing the schedule management function when starting up the schedule function.

A processing flow of the information system will be explained with reference to the drawings in FIGS. 10 through 17. These processes are actualized as computer programs on the servers having the respective functions. FIG. 10 is a flowchart showing a method of determining the priority for taking charge of the schedule management function when starting up the schedule function. In this process, the schedule management server (this server is also referred to as a server executing the highest-order schedule function) having the schedule management function is determined. Herein, the explanation will be given in a way that exemplifies a case where the server 1-1 starts up the schedule function.

To begin with, when starting up the schedule function of the server 1-1, the server 1-1 refers to the schedule function control area of the shared disk 2. Then, the server 1-1 refers to the schedule function control area, thereby checking whether the schedule function of the server itself exists in a list or not. Namely, the server 1-1 judges whether or not an entry associated with the self server is defined in the schedule function control area (S1).

If the entry associated with the self server is not defined in the schedule function control area, the server 1-1 stops the schedule function (S2). Hereafter, the server 1-1 does not execute the schedule function.

Whereas if the entry associated with the self server is defined in the schedule function control area, the server 1-1 acquires the processing priority of the self server. Then, the server 1-1 changes, to "active", the status of its own schedule function in the schedule function control area (S3).

Next, the server 1-1 searches for other schedule functions (other servers) with the schedule processing date/time set in the schedule function control area (S4).

Then, the server 1-1 judges whether or not there exist the schedule functions (other servers) which keeps setting the schedule processing date/time therein by a time period (S5). If there exist the schedule functions (other servers) which keeps setting the schedule processing date/time therein by a time period, the server 1-1 finishes the process as it is.

Whereas if there exist none of the schedule functions (other servers) which keeps setting the schedule processing date/time therein by a time period, the server 1-1 searches for other schedule functions (other servers) that have the higher processing priority than that of the self schedule function and are "active" in their status within the schedule function control area (S6).

Then, the server 1-1 judges whether or not there exist other schedule functions (other servers) that have the higher processing priority than that of the self schedule function and are "active" in their status (S7). If there exist other schedule functions (other servers) that have the higher processing priority than that of the self schedule function and are "active" in their status, the server 1-1 finishes the process as it is.

Whereas if there exist none of other schedule functions (other servers) that have the higher processing priority than that of the self schedule function and are "active" in their status, the server 1-1 sets the schedule processing date/time of the schedule function of the server 1-1 itself within the schedule function control area (S8) With this setting, the server 1-1 comes to operate as the schedule management server (i.e., the highest-order schedule function).

Figure 11:
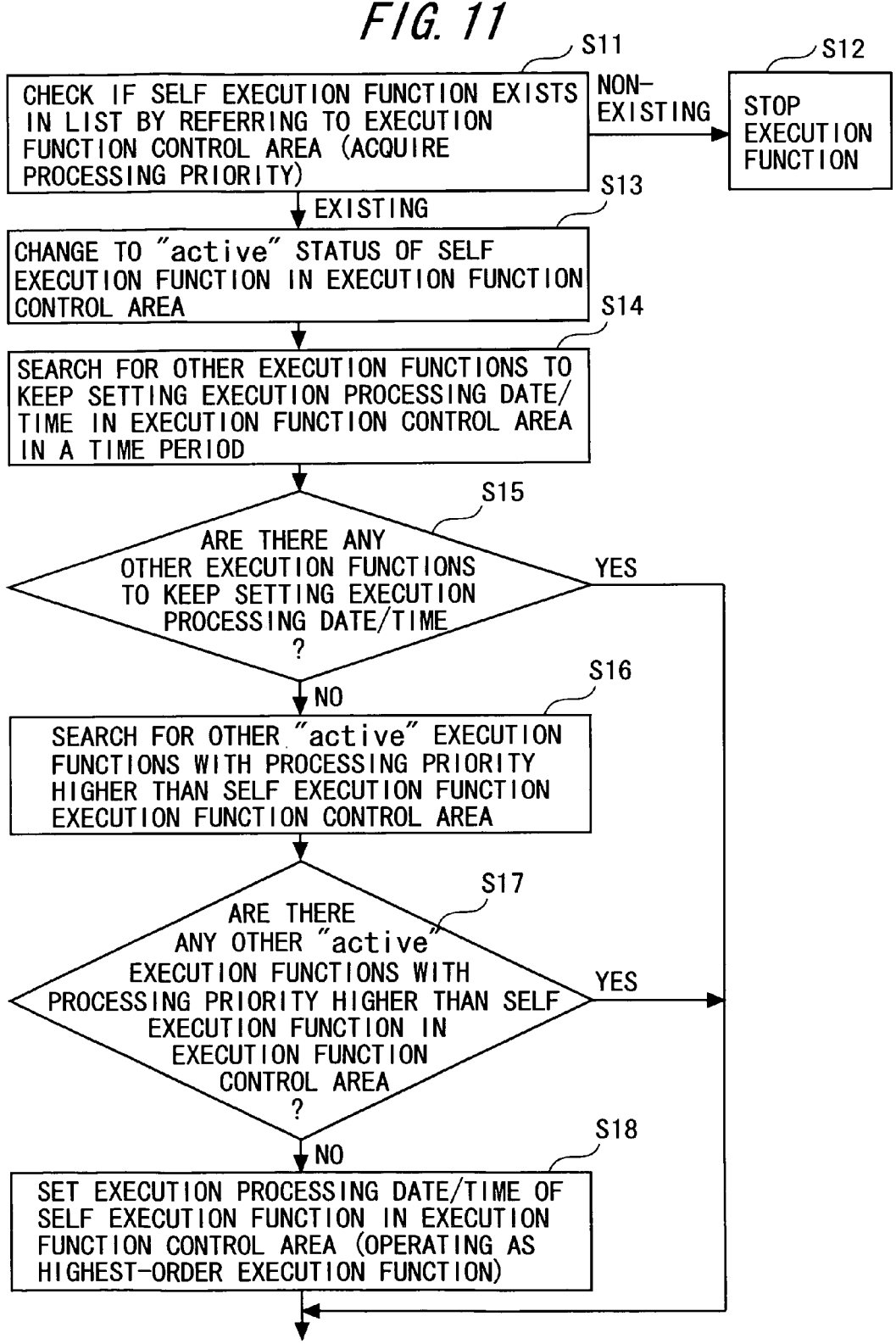
FIG. 11 is a flowchart showing a method of determining processing priority when starting up the execution function.

FIG. 11 is a flowchart showing a method of determining the processing priority when starting up the execution function. In this process, the execution management server (this server is also referred to as a server executing the highest-order execution function) executing the execution management function is determined. Herein, the explanation will be given in a way that exemplifies a case where the server 1-5 starts up the execution function.

To start with, when starting up the execution function of the server 1-5, the server 1-5 refers to the execution function control area of the shared disk 2. Then, the server 1-5 refers to the execution function control area, thereby checking whether the execution function of the server itself exists in the list or not. Namely, the server 1-5 judges whether or not an entry associated with the self server is defined in the execution function control area (S11).

If the entry associated with the self server is not defined in the execution function control area, the server 1-5 stops the execution function (S12).

Whereas if the entry associated with the self server is defined in the execution function control area, the server 1-5 acquires the processing priority of the self server. Then, the server 1-5 changes, to "active", the status of its own execution function in the execution function control area (S13).

Next, the server 1-5 searches for other execution functions (other servers) which keeps setting the execution processing date/time in the execution function control area by a time period (S14).

Then, the server 1-5 judges whether or not there exist the execution functions (other servers) which keeps setting the execution processing date/time therein by a time period (S15). If there exist the execution functions (other servers) which keeps setting the execution processing date/time therein by a time period, the server 1-5 finishes the process as it is.

Whereas if there exist none of the execution functions (other servers) which keeps setting the execution processing date/time therein by a time period, the server 1-5 searches for other execution functions (other servers) that have the higher processing priority than that of the self execution function and are "active" in their status within the execution function control area (S16).

Then, the server 1-5 judges whether or not there exist other execution functions (other servers) that have the higher processing priority than that of the self execution function and are "active" in their status (S17). If there exist other execution functions (other servers) that have the higher processing priority than that of the self function and are "active" in their status, the server 1-5 finishes the process as it is.

Whereas if there exist none of other execution functions (other servers) that have the higher processing priority than that of the self execution function and are "active" in their status, the server 1-5 sets the execution processing date/time of the execution function of the server 1-5 itself within the execution function control area (S18). With this setting, the server 1-5 comes to operate as the execution management server (i.e., the highest-order function).

Figure 12:
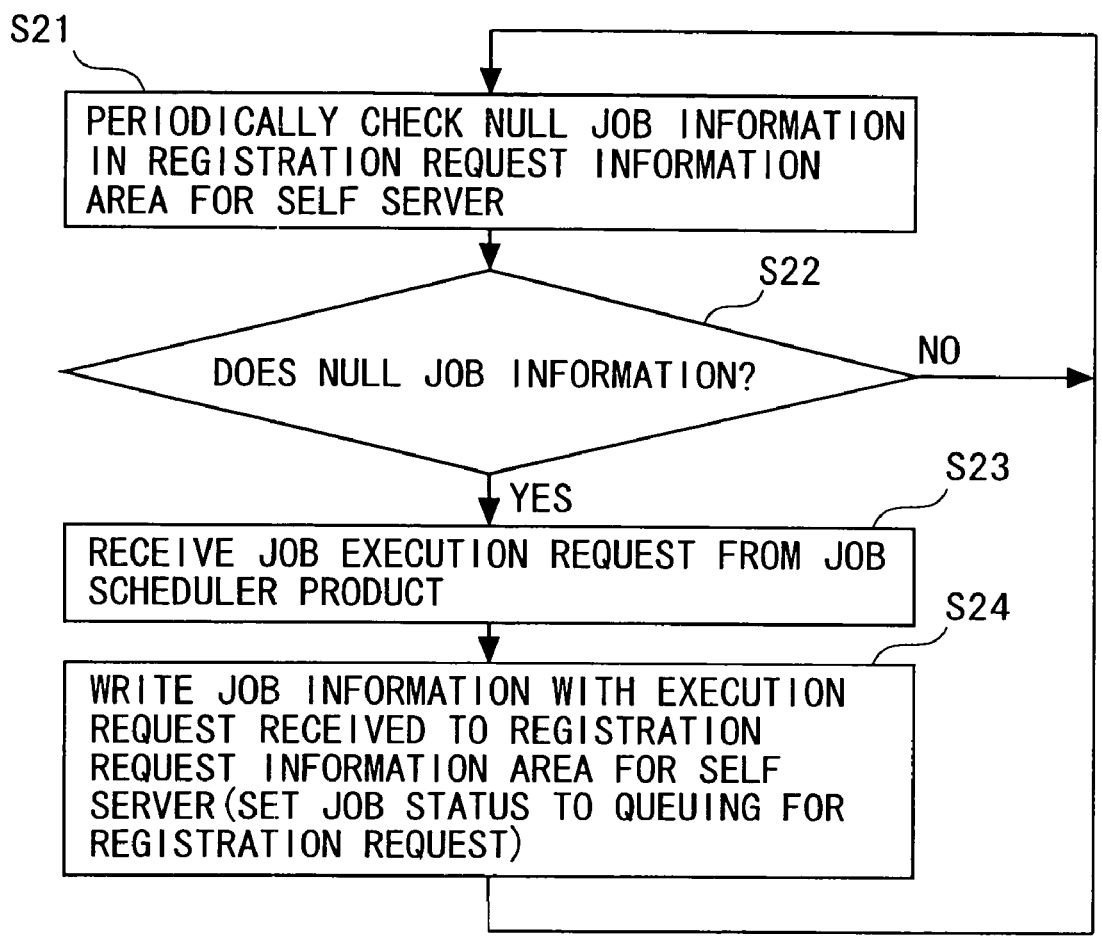
FIG. 12 is a diagram showing a processing flow of a server 1-2 executing a general schedule function.

FIG. 12 shows a processing flow of the server 1-2 executing the general schedule function (an assumption herein is that the server 1-2 executes the general schedule function). The general schedule function herein connotes the job registration request function. Namely, this function represents the schedule function other than the function (the highest-order schedule function) of the schedule management server.

In this process, the server executing the general schedule function periodically checks whether the registration request information area for the self server contains null job information or not (S21). Then, if the null job information exists (a case of YES in S22), the server 1-2 receives the job execution request from the job scheduler product (S23). The server 1-2, however, may receive the job execution request made by the operator's manipulation.

Then, the server 1-2 writes the job information with the execution request received to the registration request information area for the self server. At this time, the server 1-2 sets the job in the queued status for the registration request (S24).

Figure 13:
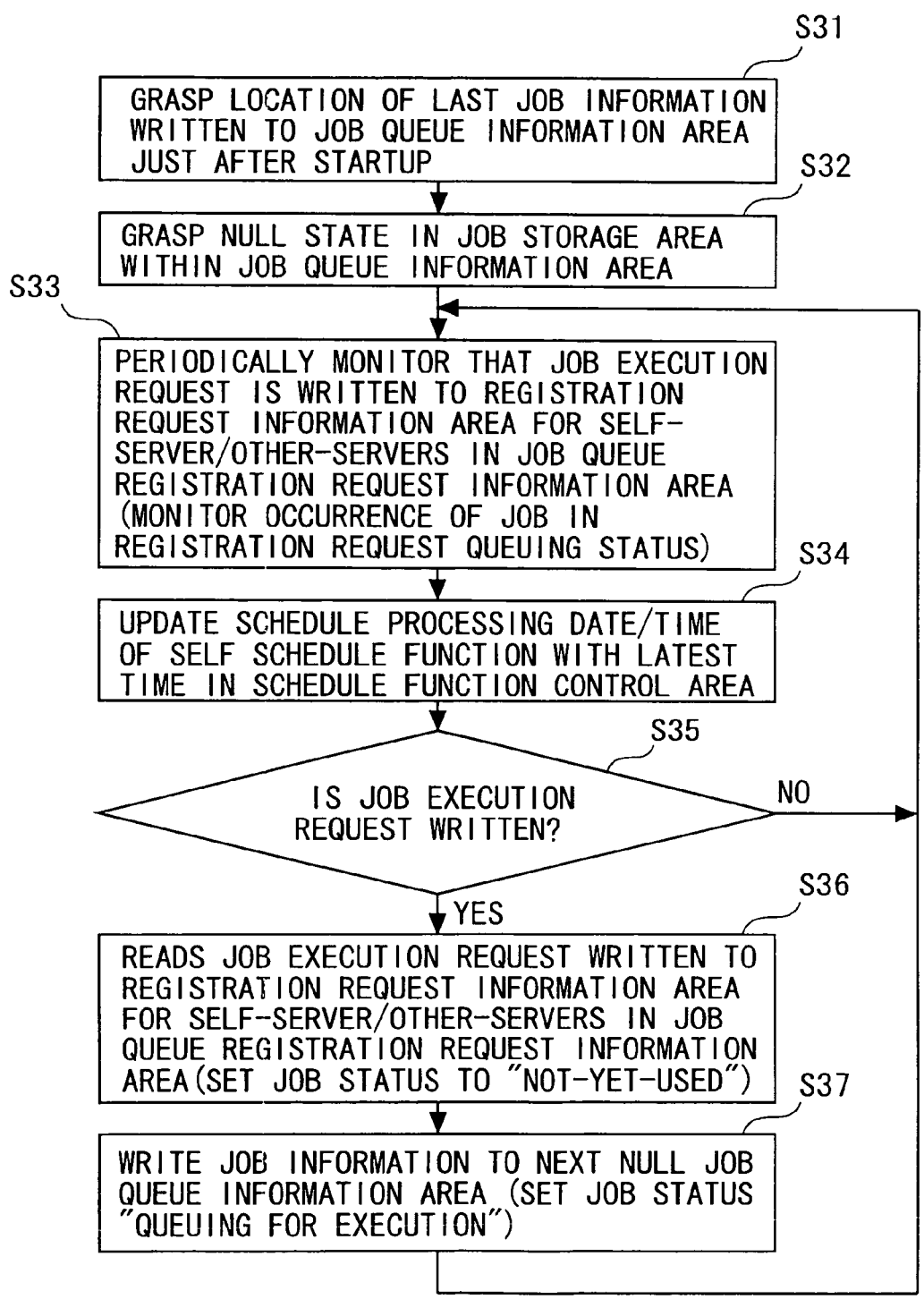
FIG. 13 is a diagram showing a processing flow of the schedule management function (highest-order schedule function) of the schedule management server.

FIG. 13 shows a processing flow of the schedule management function (the highest-order schedule function) of the schedule management server. An assumption in the following discussion is that the server 1-1 executes the schedule management function.

In this process, at first, the server 1-1 grasps a location of the last job information written to the job queue information area immediately after the startup (S31).

Next, the server 1-1 grasps a null state in the job queue information area (S32).

Next, the server 1-1 periodically monitors that the job execution request is written to the registration request information area for the self-server/other-servers in the job queue registration request information area. Namely, the server 1-1 monitors occurrence of the job in the queued status for the registration request (S33).

Then, the server 1-1 updates the schedule processing date/time of the schedule function of the server itself with the latest time in the schedule function control area (S34). Next, the server 1-1 judges whether the job execution request is written or not (S35). If the job execution request is not written, the server 1-1 returns the control to S33.

Whereas if the job execution request is written, the server 1-1 reads the job execution request written to the registration request information area for the self-server/other-servers in the job queue registration request information area. Further, the server 1-1 sets "not-yet-used" in the job status of the concerned record in the registration request information area (S36).

Next, the server 1-1 writes the job execution request to the empty job queue information area. Further, the server 1-1 sets "queuing for execution" in the job status of the concerned record in the job queue information area (S37).

Figure 14:
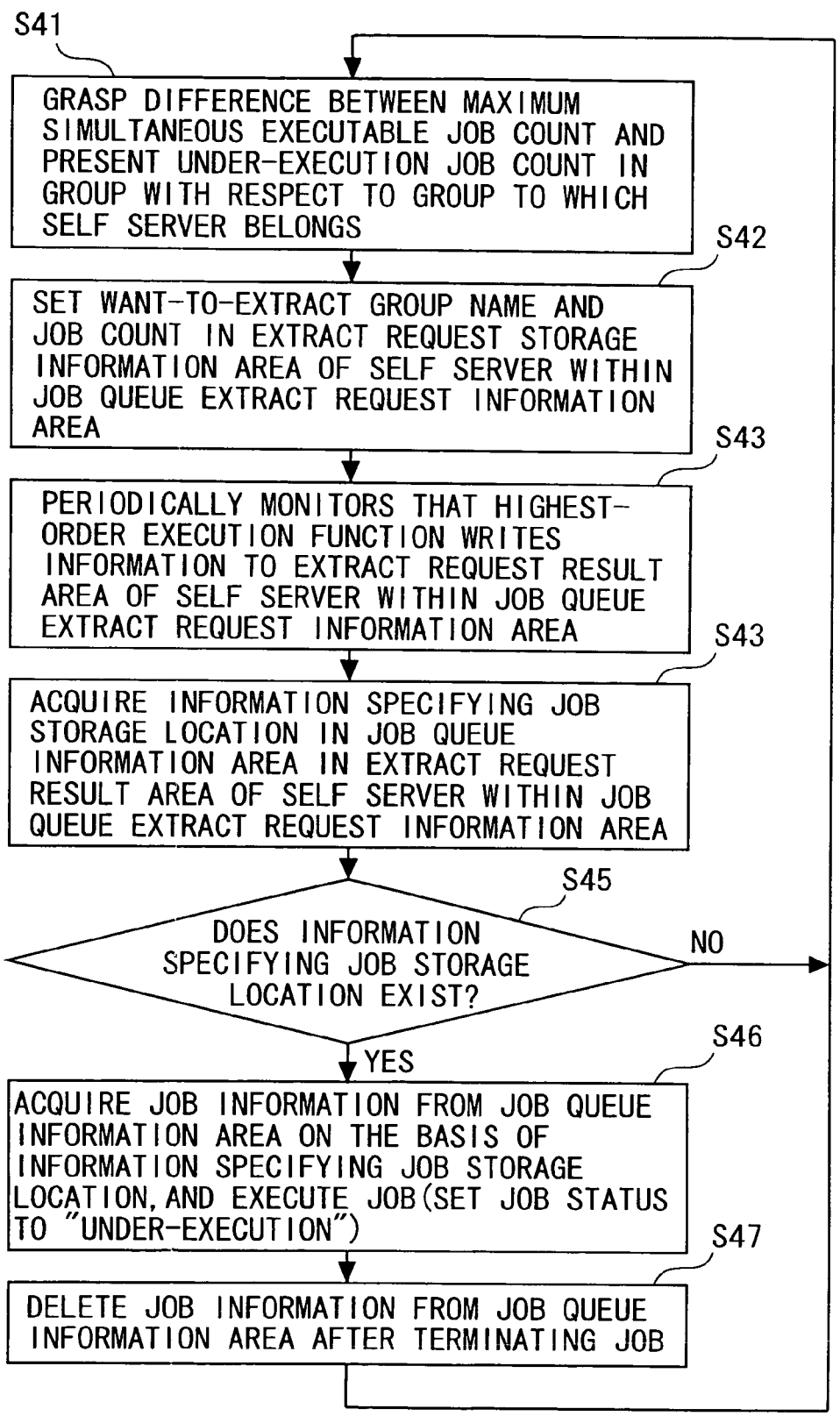
FIG. 14 is a diagram showing a processing flow of a server 1-4 executing a general execution function.

FIG. 14 shows a processing flow of the server 1-4 executing the general execution function (it is herein assumed that the server 1-4 executes the general execution function). The general execution function herein connotes a function assigned the job in the job queue information area and executing this job. Namely, this function represents the execution function other than the function (the highest-order execution function) of the execution management server.

In this process, the server 1-4 executing the general execution function grasps a difference between a maximum simultaneous executable job count and a present under-execution job count within the group with respect to the group to which the self server belongs (S41).

Next, the server 1-4 sets a want-to-extract group name and a job count in the extract request storage information area 100 for the self server within the job queue extract request information area (S42). This job count is a difference between, e.g., the maximum simultaneous executable job count and the present under-execution job count. Further, this job count may also be a value into which this difference is corrected by a predetermined coefficient.

Then, the server 1-4 periodically monitors that the execution management server (the highest-order execution function) writes the information to the extract request result area 101 in the job queue extract request information area (S43).

Then, the server 1-4 acquires the job assigned to the self server (which is the information specifying the job storage location within the job queue information area) from the extract request result area 101 in the job queue extract request information area (S44)

Subsequently, if the information specifying the job storage location does not exist in the extract request result area 101 for the self server (a case of NO in S45), the server 1-4 returns the control to S41.

Whereas if the information specifying the job storage location exists in the extract request result area 101 for the self server (a case of YES in S45), the server 1-4 acquires the job information from the job queue information area on the basis of the information specifying the job storage location, and executes the job. At this time, the server 1-4 sets "under-execution" in the job status (S46).

Then, the server 1-4 deletes the job information from the job queue information area after terminating the job (S47).

Figure 15:
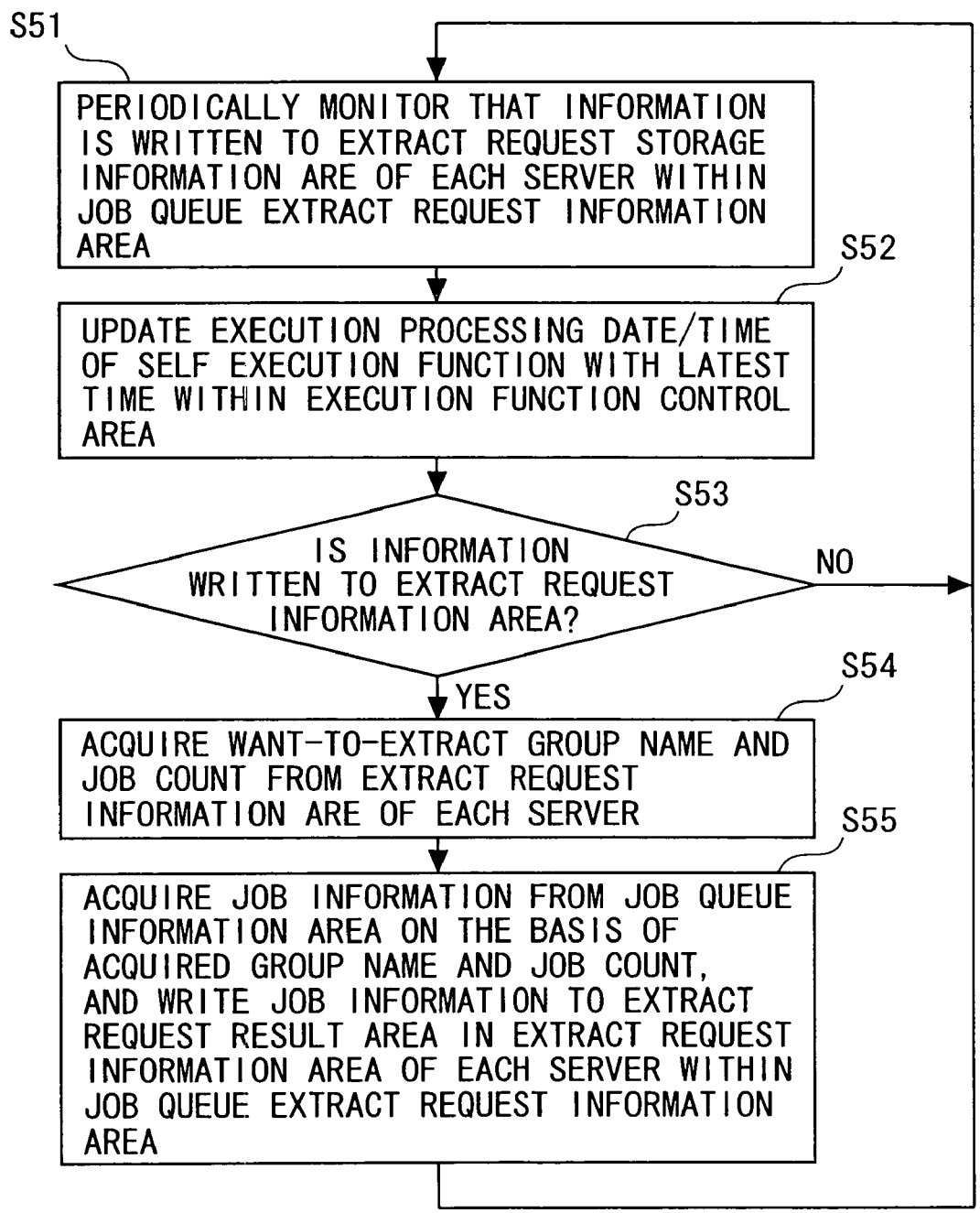
FIG. 15 is a diagram showing a processing flow of the function (the highest-order execution function) of the execution management server.

FIG. 15 shows a processing flow of the function (the highest-order schedule function) of the execution management server. Hereinafter, it is assumed that the server 1-5 executes the execution management function.

In this process, to start with, the server 1-5 periodically monitors that the information is written to the extract request storage information area 100 for each server within the job queue extract request information area (S51).

Next, the server 1-5 updates the execution processing date/time of the self execution function with the latest time within the execution function control area (S52).

The, the server 1-5 judges whether or not the information is written to the extract request information area for the self-server/other-servers (S53). If the information is not written to the extract request information area, the server 1-5 returns the control to S51.

Whereas if the information is written to the extract request information area, the server 1-5 acquires the group name and the job count that are requested to be extracted from the extract request information area for each server (S54).

Subsequently, the server 1-5 searches, based on the acquired group name and job count, the job queue information area for the job execution request concerned. Moreover, the server 1-5 writes the storage location in the job queue information area, of the thus-searched job execution request to the extract request result area 101 within the extract request information area for each server (S55).

Figure 16:
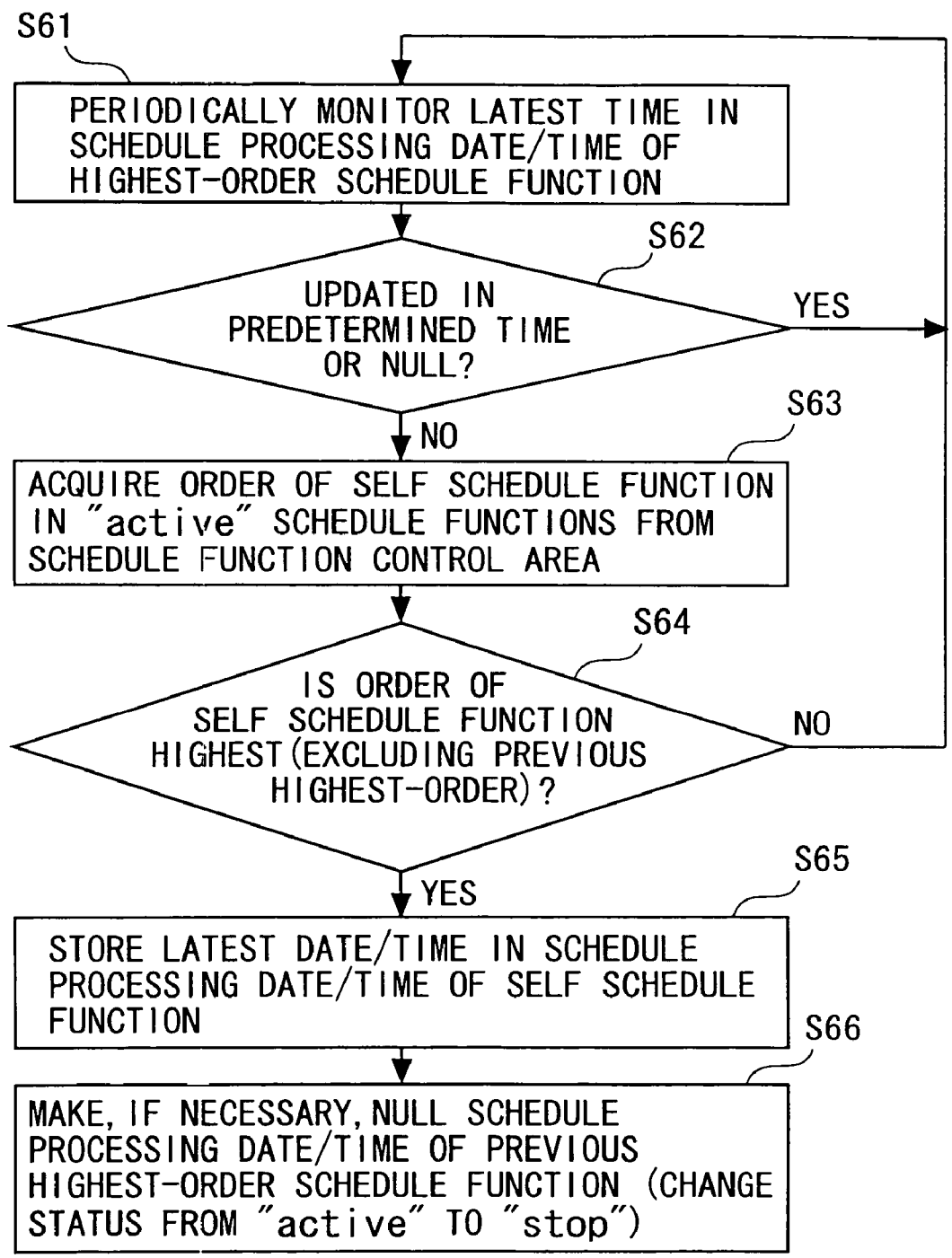
FIG. 16 is a diagram showing a flow of determining an order of a next schedule management server if the schedule management server (the highest-order schedule function) stops.

FIG. 16 illustrates a processing flow showing the order of how the next schedule management server is determined if the schedule management server (the highest-order schedule function) stops. Hereinafter, it is assumed that the server 1 (which is the generic name of the servers having the general schedule function) executes the process in FIG. 16.

In this process, the server 1 periodically monitors the latest time in the schedule processing date/time of the schedule management server (the highest-order schedule function) (S61).

Then, the server 1 judges whether update is conducted within a predetermined period of time or not (S62) (note that if the "schedule processing date/time" field has no entry (null), the server 1 deems that the schedule management server (the highest-order schedule function) is replaced by one other server, and searches for the entry in the schedule function control area to which the schedule processing date/time is written).

If the update is conducted within the predetermined period of time, the server 1 returns the control to S71. Whereas if the update is not conducted within the predetermined period of time, the server 1 acquires from the schedule function control area the order of the self schedule function in the schedule functions that are "active" in their status (S63).

Then, the server 1 judges whether or not the order of the self schedule function is the highest-order (excluding the previous highest-order) (S64). If the order of the self schedule function is not the highest-order, the server 1 returns the control to S71.

Whereas if the order of the self schedule function is the highest-order, the server 1 stores the latest date/time in the "schedule processing date/time" field of the self schedule function (S65). With this setting, the server 1 becomes the schedule management server (the highest-order schedule function).

Moreover, the server 1, if necessary, may make null the entry in the schedule processing date/time of the previous schedule management server (the highest-order schedule function). Further, the server 1 may change the status (included in the schedule function control area shown in FIG. 7) of the previous schedule management server from "active" to "stop" (S66).

Figure 17:
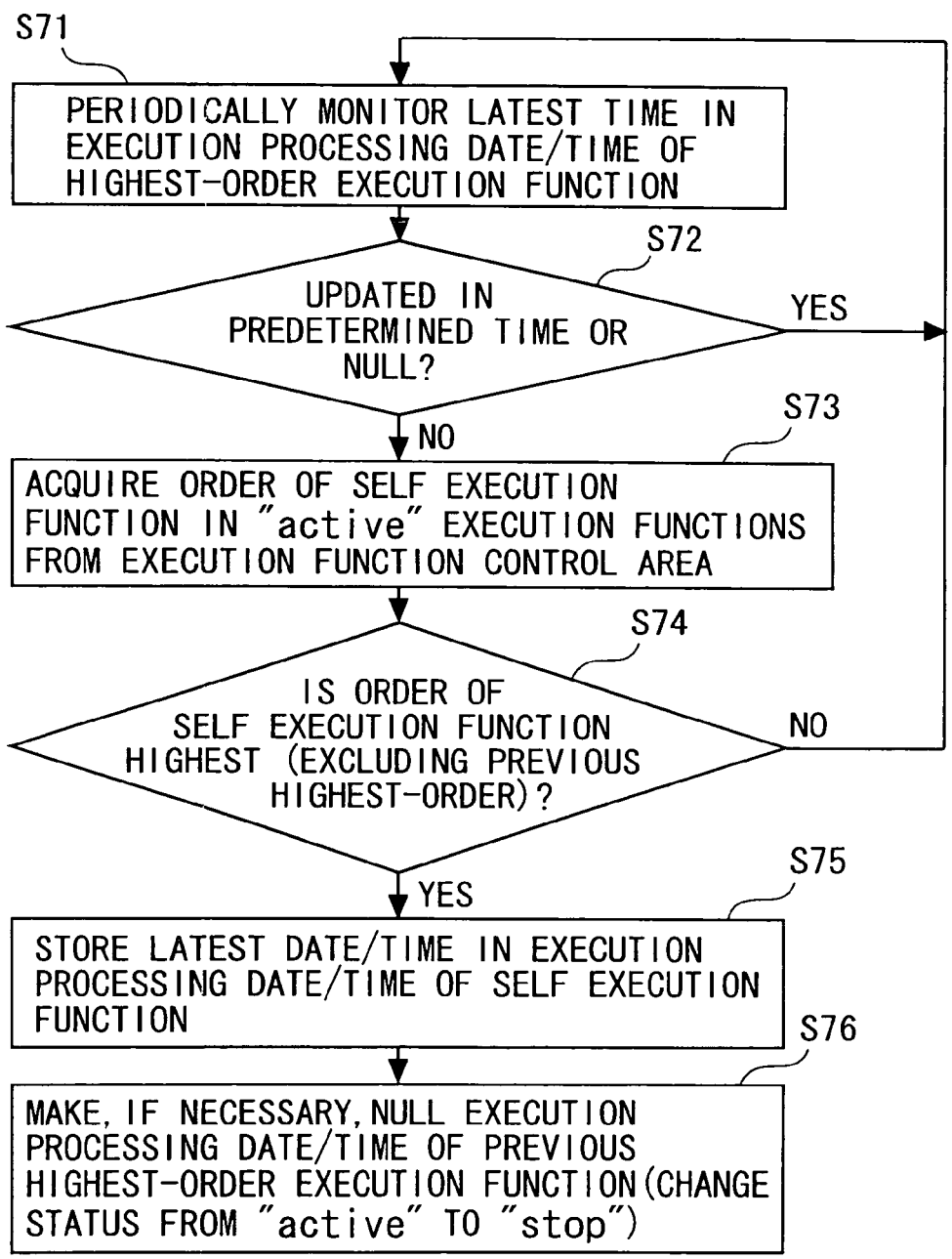
FIG. 17 is a diagram showing a flow of determining a next execution management server if the execution management server (the highest-order execution function) stops.

FIG. 17 illustrates a processing flow showing how the next execution management server is determined if the execution management server (the highest-order execution function) stops. Hereinafter, it is assumed that the server 1 (which is the generic name of the servers having the general execution function) executes the process in FIG. 17.

In this process, the server 1 periodically monitors the latest time in the schedule processing date/time of the execution management server (the highest-order function) (S71).

Then, the server 1 judges whether the update is conducted within a predetermined period of time or not (S72) (note that if the "schedule processing date/time" field has no entry (null), the server 1 deems that the execution management server (the highest-order execution function) is replaced by one other server, and searches for the entry in the execution function control area to which the execution processing date/time is written).

If the update is conducted within the predetermined period of time, the server 1 returns the control to S71. Whereas if the update is not conducted within the predetermined period of time, the server 1 acquires from the execution function control area the order of the self execution function in the execution functions that are "active" in their status (S73).

Then, the server 1 judges whether or not the order of the self execution function is the highest-order (excluding the previous highest-order) (S74). If the order of the self execution function is not the highest-order, the server 1 returns the control to S71.

Whereas if the order of the self execution function is the highest-order, the server 1 stores the latest date/time in the "schedule processing date/time" field of the self execution function (S75). With this setting, the server 1 becomes the execution management server (the highest-order execution function).

Moreover, the server 1, if necessary, may make null the entry in the execution processing date/time of the previous execution management server (the highest-order execution function). Further, the server 1 may change the status (included in the execution function control area shown in FIG. 8) of the previous schedule management server from "active" to "stop" (S76).

As discussed above, according to the information system in the embodiment, the jobs executed by the plurality of servers can be managed by use of the job queue partition on the shared disk 2. In this case, the plurality of servers are made to execute the general schedule function of making the request for the registration in the job queue information area, while restricting the function of registering the jobs in the job queue information area to the schedule management server (the highest-order schedule function), whereby the job management without any contradiction can be attained. Further, the schedule functions of requesting the jobs to be executed are distributed to the servers having the general schedule function, wherein the job execution request can be given from the plurality of servers.

Moreover, it is possible to presume the unexpected stop of the schedule management server by monitoring the update in the schedule processing date/time that is made by the schedule management server. Then, in the case of presuming that the schedule management server stops, the next schedule management server (the highest-order schedule function) can be determined according to the priority among the servers that is set in the schedule function control area. Accordingly, in the information system, the registration of the jobs can be managed by the single server in a system enabling the job information to be backed up by the plurality of servers. It is therefore feasible to avoid, to the greatest possible degree, such a situation that the schedule management process stops even when the schedule management server stops.

Similarly, according to the information system in the embodiment, the plurality of servers are made to execute the jobs registered in the job queue information, while restricting the function of assigning these jobs to the servers to the execution management server (the highest-order execution function), whereby the job management without any contradiction can be attained. Further, the job execution functions are distributed to the servers having the general execution function, whereby the load can be distributed to the plurality of servers.

Further, the unexpected stop of the execution management server can be presumed by monitoring the update in the execution processing date/time by the execution management server. Then, in the case of presuming that the execution management server stops, the next the execution management server (the highest-order execution function) can be determined according to the priority among the servers that is set in the execution function control area. Accordingly, in the information system, the execution of the jobs can be managed by the single server in the system enabling the job information to be backed up by the plurality of servers. It is therefore possible to avoid, to the greatest possible degree, such a situation that the execution management process stops even when the execution management server stops.

<Recording Medium Readable by Computer>

A program for making a computer, other machines, devices (which will hereinafter be referred to as the computer etc) actualize any one of the functions given above can be recorded on a recording medium readable by the computer etc. Then, the computer etc is made to read and execute the program on this recording medium, whereby the function can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disk, a magneto-optic disk, a CD-ROM, a CD-R/W, a DVD, a DAT, an 8 mm tape, a memory card, etc are given as those demountable from the computer etc.

Further, a hard disk, a ROM (Read-Only Memory), etc are given as the recording mediums fixed within the computer etc.

The disclosures of Japanese patent application No. JP 2006-073173 filed on Mar. 16, 2006 including the specification, drawings and abstract are incorporated herein by reference.

What is claimed is:

1. A server system comprising a plurality of servers including a server functioning as a first server or a second server, and a shared storage device shared with the plurality of servers, the shared storage device including;
   a job queue storage area controlling a job execution order by registering a job execution request and stored with a status of the job till the execution of the job is completed;
   a job queue registration request storage area, provided for every request server requesting the job to be executed, to which to write such an item of registration request information as to request the registration of the job execution request in the job queue storage area; and
   a job assignment storage area provided for every execution server executing the job and stored with a relationship between the execution server and the execution request of the job assigned to the execution server,
   the first server including a job queue registration processing unit registering the job execution request in the job queue storage area according to the registration request information written to the job queue registration request storage area,
   the second server including an assignment processing unit assigning the job execution request registered in the job queue storage area to the execution server, and writing the relationship between the execution server and the job execution request of the job assigned to the execution server to the job assignment storage area, and
   the execution server including an execution unit acquiring the job execution request from the job assignment storage area provided for the execution server, and executing the assigned job.

2. The server system according to claim 1, wherein the shared storage device further includes a first server management information storage area stored with, for every server to become the first server, first server management information containing priority level information used for one of at least two or more servers to become the first server in the plurality of servers and to function as such and information showing whether the server functions as the first server at the present, and
   wherein one of at least two or more servers functions as the first server according to the priority level information.

3. The server system according to claim 2, wherein in the plurality of servers of which the first server management information is stored in the first server management information storage area, the servers excluding the server functioning as the first server monitor an operating status of the server functioning as the first server, and, when presuming that the server functioning as the first server stops, one of the servers excluding the server functioning as the first server is determined to be the first server according to the priority level information and thus functions as the first server.

4. The server system according to claim 1, wherein the shared storage device further includes a second server management information storage area stored with, for every server to become the second server, second server management information containing priority level information used for one of at least two or more servers to become the second server in the plurality of servers and to function as such and information showing whether the server functions as the second server at the present, and
   wherein one of at least two or more servers functions as the second server according to the priority level information.

5. The server system according to claim 4, wherein in the plurality of servers of which the second server management information is stored in the second server management information storage area, the servers excluding the server functioning as the second server monitor an operating status of the server functioning as the second server, and, when presuming that the server functioning as the second server stops, one of the servers excluding the server functioning as the second server is determined to be the second server according to the priority level information and thus functions as the second server.

6. An information processing method executed by a server system comprising a plurality of servers including a server functioning as a first server or a second server, and a shared storage device shared with the plurality of servers, the shared storage device including;
   a job queue storage area controlling a job execution order by registering a job execution request and stored with a status of the job till the execution of the job is completed;
   a job queue registration request storage area, provided for every request server requesting the job to be executed, to which to write such an item of registration request information as to request the registration of the job execution request in the job queue storage area; and
   a job assignment storage area provided for every execution server executing the job and stored with a relationship between the execution server and the execution request of the job assigned to the execution server,
   the information processing method comprising:
   executing by the first server, a job queue registration processing step of registering the job execution request in the job queue storage area according to the registration request information written to the job queue registration request storage area;
   executing by the second server, an assignment processing step of assigning the job execution request registered in the job queue storage area to the execution server, and writing the relationship between the execution server and the job execution request of the job assigned to the execution server to the job assignment storage area; and
   acquiring by the execution server, the job execution request from the job assignment storage area provided for the execution server, and executing the assigned job.

7. The information processing method according to claim 6, wherein the shared storage device further includes a first server management information storage area stored with, for every server to become the first server, first server management information containing priority level information used for one of at least two or more servers to become the first server in the plurality of servers and to function as such and information showing whether the server functions as the first server at the present, and
   wherein one of at least two or more servers functions as the first server according to the priority level information.

8. The information processing method according to claim 7, wherein in the plurality of servers of which the first server management information is stored in the first server management information storage area, the servers excluding the server functioning as the first server monitor an operating status of the server functioning as the first server, and, when presuming that the server functioning as the first server stops, one of the servers excluding the server functioning as the first server is determined to be the first server according to the priority level information and thus functions as the first server.

9. A recording medium recorded with a program executable by a computer, in a server system comprising a plurality of servers and a shared storage device shared with the plurality of servers, which makes each of the servers function as any one of the servers including a first server or a second server, the shared storage device including;
   a job queue storage area controlling a job execution order by registering a job execution request and stored with a status of the job till the execution of the job is completed;
   a job queue registration request storage area, provided for every request server requesting the job to be executed, to which to write such an item of registration request information as to request the registration of the job execution request in the job queue storage area; and
   a job assignment storage area provided for every execution server executing the job and stored with a relationship between the execution server and the execution request of the job assigned to the execution server, the program comprising:
   making the first server execute a job queue registration processing step of registering the job execution request in the job queue storage area according to the registration request information written to the job queue registration request storage area,
   making the second server execute an assignment processing step of assigning the job execution request registered in the job queue storage area to the execution server, and writing the relationship between the execution server and the job execution request of the job assigned to the execution server to the job assignment storage area, and
   making the execution server acquire the job execution request from the job assignment storage area provided for the execution server, and execute the assigned job.

10. The recording medium recorded with the program executable by a computer according to claim 9, wherein the shared storage device further includes a first server management information storage area stored with, for every server to become the first server, first server management information containing priority level information used for one of at least two or more servers to become the first server in the plurality of servers and to function as such and information showing that the server functions as the first server at the present, and
   wherein one of at least two or more servers is made to function as the first server according to the priority level information.

11. The recording medium recorded with the program executable by a computer according to claim 10, wherein in the plurality of servers of which the first server management information is stored in the first server management information storage area, the servers excluding the server functioning as the first server monitor an operating status of the server functioning as the first server, and, when presuming that the server functioning as the first server stops, one of the servers excluding the server functioning as the first server, which is determined to be the first server according to the priority level information, is made to function as the first server.

* * * * *